G. RENNERFELT.
THRUST BEARING.
APPLICATION FILED MAY 25, 1909.
1,053,437.
Patented Feb. 18, 1913.
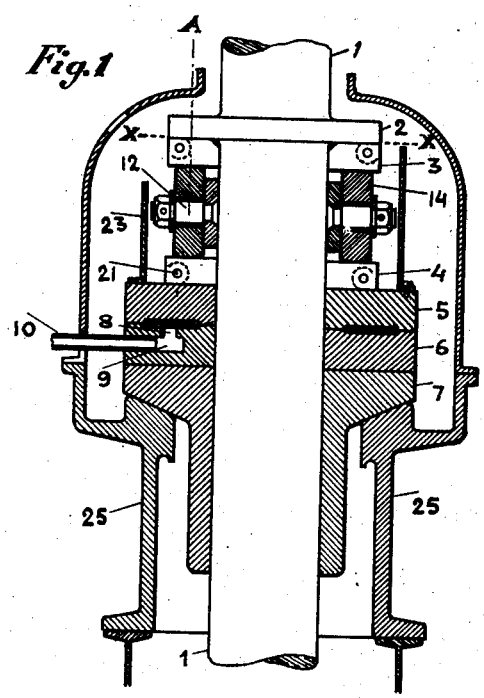
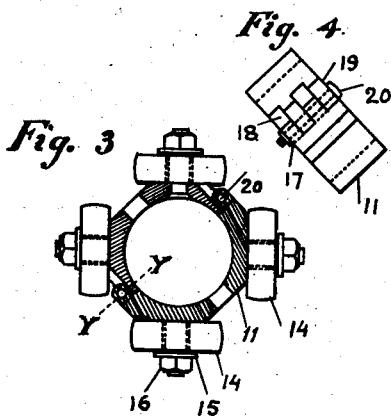
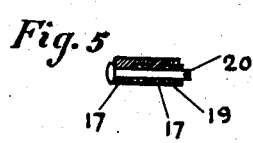
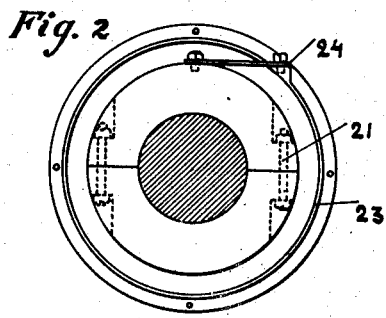
WITNESSES:
Coatter Robertson
Thomas L. Tomkins
INVENTOR
Gustaf Rennerfelt

UNITED STATES PATENT OFFICE.

GUSTAF RENNERFELT, OF NEW YORK, N. Y., ASSIGNOR TO PLANET ENGINEERING COMPANY, A CORPORATION OF NEW YORK.

THRUST-BEARING.

1,053,437.      Specification of Letters Patent.      Patented Feb. 18, 1913.

Application filed May 25, 1909. Serial No. 498,230.

*To all whom it may concern:*

Be it known that I, GUSTAF RENNERFELT, a subject of the King of Sweden, and a resident of New York, in the county of New York and State of New York, have made a new and useful Improvement in Thrust-Bearings, of which the following is a specification.

My invention relates to improvements in thrust bearings of the type in which balls or rollers are used for sustaining the thrust. The object of the invention is to make such bearings more applicable or better adapted than has heretofore been the case for certain purposes and certain kinds of machinery, and the object is also to make such bearings more efficient and reliable in their operation, and so that they may be cheaply manufactured and easy to install.

A step bearing, lubricated by oil or water under great pressure, is frequently used for supporting heavy loads, rotating at high speed, such for instance as a turbine, and it happens occasionally that the pump which supplies the pressure gets out of order so that the necessary amount of oil or water will not be furnished to the bearing. Upon such an occasion the bearing will run dry and become abnormally hot, and it will frequently be entirely destroyed before the turbine can be stopped by the attendant. My invention is designed to overcome this trouble by automatically disengaging or cutting the step bearing out of service and engaging an auxiliary bearing which is under normal conditions not operative. The necessity of shutting down the turbine will be obviated since the auxiliary bearing is designed to carry the load either for any length of time, or for such length of time as may be necessary for putting the pump again in proper working condition.

I will describe my invention in the following specification and point out the novel features thereof in claims.

Referring to the drawings: Figure 1. is a sectional side elevation of a thrust bearing constructed according to my invention. Fig. 2. is a sectional plan view, the section being taken on the line X X of Fig. 1. Fig. 3. is a plan view of a detail referred to in the specification as a spider. Fig. 4 is a side view of the same spider. Fig. 5. is a detail sectional view of the spider, the section being taken on the line Y—Y of Fig. 3. Fig. 6. is a side view of a detail referred to as a strip.

Like characters of reference designate corresponding parts in all of the figures.

1. designates a shaft vertically disposed to which my bearing is applied, the shaft being arranged to be rotated as by a turbine, and to receive pressure in an axial direction.

2. is a shoulder on the shaft and 3. is a disk of hard material, abutting against the shoulder, and arranged to rotate with the shaft. 4. is a second disk, resting on a plate 5, and arranged to normally rotate together with the plate at the same speed as the shaft. 6. designates another plate arranged to be stationary and resting on top of a lateral bearing 7 for the shaft. The plate 6 is provided with holes 8 and 9. A pipe 10 is fitted into the hole 9 and serves as means for conveying liquid under pressure between the two plates 5 and 6, so that when the shaft is being rotated, the two plates will be normally separated by a film of liquid and the resistance offered by the plates to the rotation of the shaft will be relatively small. Such an arrangement of a rotatable and a stationary plate with means for conveying liquid under pressure between the plates is known in the art as a liquid or hydraulic step bearing.

11. is a spider loosely mounted on the shaft between the two disks; a plurality of studs 12, 12, extend from the spider, and one or more than one roller 14 is loosely mounted on each stud. A washer 15 and nut 16 fastened to the end of a stud serve to retain the roller on the stud. I prefer to make each roller with a spherical face, to make the hole through its center of greater diameter than the diameter of the stud, and to make its length appreciably shorter than the distance between the washer and the spider.

I prefer sometimes to construct the spider and each of the disks in halves bolted together, so that they may be applied to or removed from the shaft in a lateral direction. For such purpose I provide one-half of the spider with lugs 17 arranged to fit into slots 18 between ridges 19 of the other half of the spider. Bolts 20 are placed through holes drilled through said lugs and ridges, and are thus arranged to be withdrawn from the spider in a direction parallel to the shaft when the spider is to be removed. The two halves of a disk are kept together by bolts 21; a feather on one half fitting into a slot in the other half may be used for obtaining a more secure connection between the two halves. In order to entirely relieve the bolts 21 from all strain during the operation of the bearing, I make the shoulder 2 of such diameter that it extends beyond the dotted line A (see Fig. 1) indicating the direction of pressure between a roller and the disk 3, or in other words, the diameter of the shoulder is greater than twice the distance between the center of a roller and the center line of the shaft.

A cylinder 23, constructed in halves, if desired, is bolted to the plate 5, and serves the purposes of retaining a quantity of grease for lubricating the rollers and the spider, and of mechanically connecting together the disk 3 and the plate 5, a strip 24 of predetermined mechanical strength being fastened between the disk 3 and the top of the cylinder 23.

A housing or casing 25 constructed in halves, if desired, surrounds all of the above described parts and serves for supporting them as shown.

The mode of operation of the bearing is as follows: The pipe 10 is connected to a source of hydraulic pressure such as a pump, so that liquid is forced in between plates 5 and 6, and the shaft, together with the load it supports may be rotated without much resistance upon this liquid step bearing. The force necessary for rotating the plate 5 upon the plate 6 is transmitted from the disk 3 through the strip 24, and cylinder 23 to the plate 5, so that the plate 5, disks 3 and 4, and the rollers 14, are all being rotated with the same speed as the shaft. The rollers 14 are thus stationary relatively to the disks and as long as the proper liquid pressure is kept up through the pipe 10, the roller bearing, comprising the disks 3 and 4, and the rollers 14, will not perform the function of a bearing, although they serve for sustaining the load. If, however, the supply of liquid pressure through pipe 10 should fail, as for instance if the pump should stop, the resistance of the liquid step bearing will be very much increased, and the strip 24 will break, being designed to transmit a certain force and not more. The rotation of plate 5 and disk 4 will then cease, and the rotation of the shaft, together with the load which it supports, will take place at the roller bearing, the rollers 14 being now free to travel on the stationary disk 4.

The disk 4 and plate 5 will either rotate together (normally) or both will be stationary. For this reason they may sometimes be formed in one piece; I prefer, however, to construct them as separate parts, making the disk of hardened steel and the plate of other material such as cast iron. The friction between the disk 4 and plate 5 will serve as sufficient mechanical connection between them, so that bolts or other means for connecting them are not needed.

The roller bearing being preferably of such dimensions and strength that it will stand the service for an indefinite time, it will not be necessary when the pump stops to immediately stop the rotation of the shaft. The step bearing will not become damaged, since it was immediately and automatically cut out of service, the pump may be repaired at any convenient time, and the strip 24 may be renewed if desired at a trifling cost.

What I claim is:

1. The combination of a shaft having a shoulder, a bearing disk abutting against the shoulder and rotatable therewith, a second bearing disk loose on the shaft, a plurality of rollers between the said disks, a bearing plate loose on the shaft and in contact with the loose bearing disk, a second stationary bearing plate, a pipe connected to convey liquid between the bearing plates, and a connection between the first bearing disk and the loose bearing plate.

2. In a thrust bearing the combination of a rotatable and a stationary plate, means for conveying liquid between the plates, a roller bearing, and connection between the roller bearing and the rotatable plate, said connection being arranged to break when the resistance to rotation at the plates exceeds a predetermined limit.

3. In a thrust bearing the combination of a liquid step bearing, normally in service, comprising a stationary and a rotatable plate and means for conveying liquid between the plates, with an auxiliary bearing, and a connection between the step bearing and the auxiliary bearing adapted to operate when the resistance of the step bearing exceeds a predetermined limit, for relieving the step bearing of duty and substituting the auxiliary bearing therefor.

4. In a thrust bearing the combination of a shaft, a step bearing therefor, comprising a stationary and a rotatable plate and means for conveying liquid between the plates, an auxiliary roller bearing resting on the said latter plate and normally revolving therewith, and automatic means for substituting the auxiliary roller bearing for the step bearing when the resistance of the step bearing exceeds a certain limit.

5. The combination of a shaft arranged to be rotated, a lateral bearing therefor, a plate arranged to normally rotate with the shaft, a stationary plate, means for conveying liquid between the plates, an auxiliary bearing arranged to rest on the first plate, and to normally rotate with the shaft, and a receptacle for lubricant arranged to rotate with the auxiliary bearing.

Signed at New York in the county of New York and State of New York this 24th day of May A. D. 1909.

GUSTAF RENNERFELT.

Witnesses:
M. GINTZLER,
M. VOLETZE.